May 1, 1934.  E. W. WESCOTT  1,957,006
METHOD OF AND APPARATUS FOR CONDENSING SULPHUR
Filed June 5, 1929  2 Sheets-Sheet 1
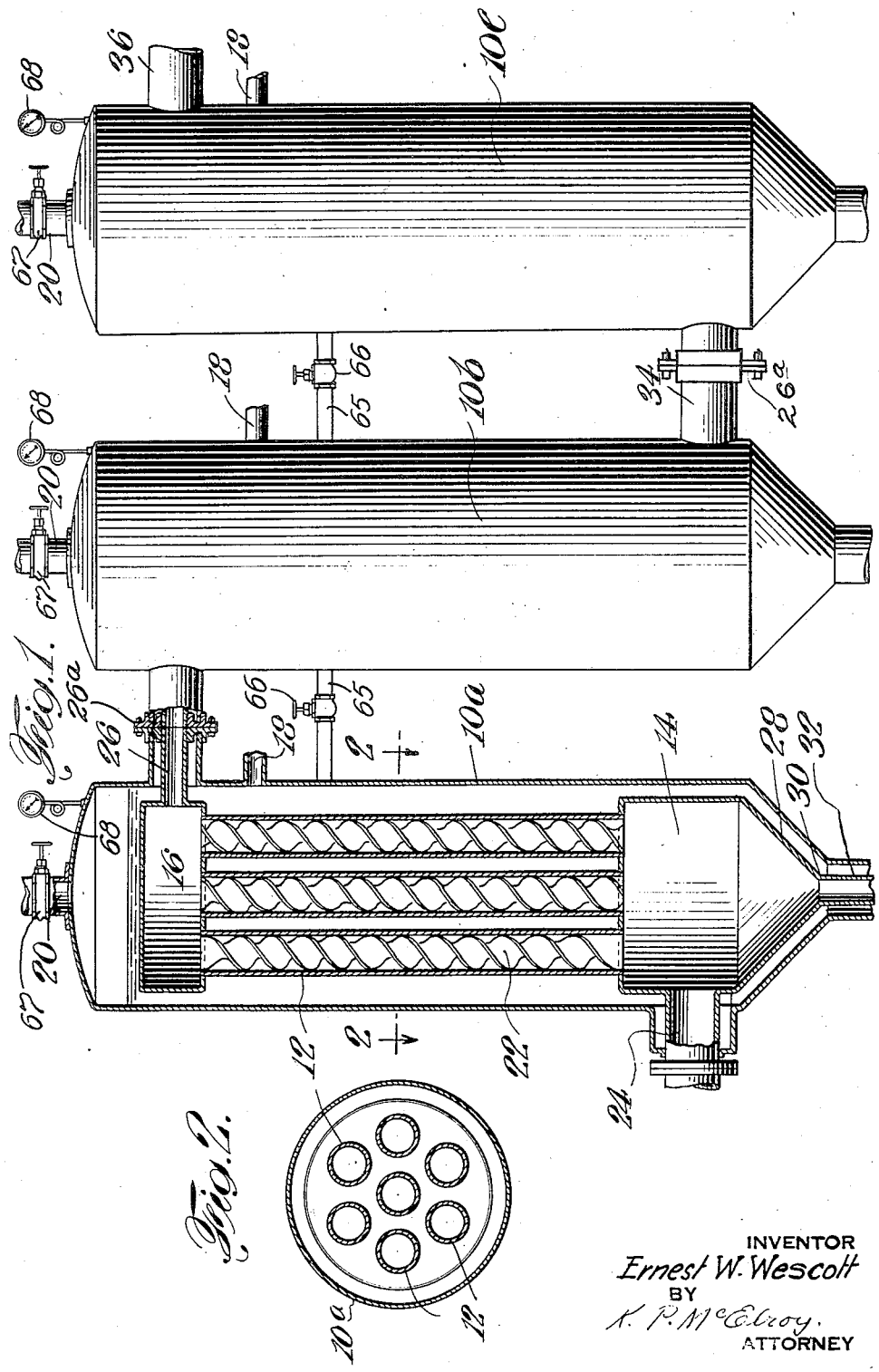
INVENTOR
Ernest W. Wescott
BY
K. P. McElroy.
ATTORNEY May 1, 1934. E. W. WESCOTT 1,957,006
METHOD OF AND APPARATUS FOR CONDENSING SULPHUR
Filed June 5, 1929 2 Sheets-Sheet 2
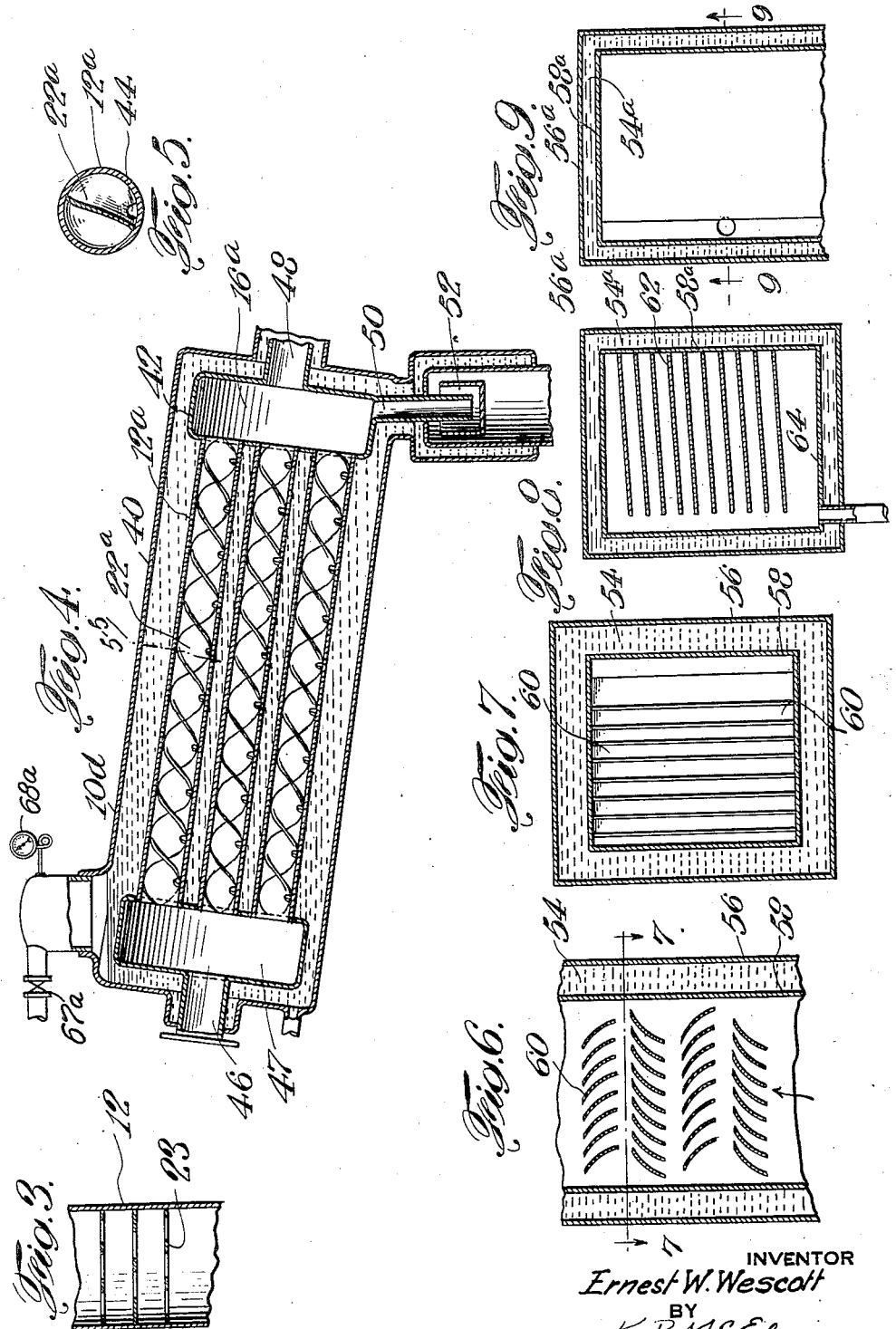

Patented May 1, 1934

1,957,006

UNITED STATES PATENT OFFICE 1,957,006

METHOD OF AND APPARATUS FOR CONDENSING SULPHUR

Ernest W. Wescott, Niagara Falls, N. Y., assignor, by mesne assignments, to Sulphide Corporation, a corporation of Delaware Application June 5, 1929, Serial No. 368,568
In Canada April 27, 1927

6 Claims. (Cl. 23—227)

This invention relates to methods of, and apparatus for condensing sulphur and recovering it in liquid form from hot sulphur vapors or from gaseous mixtures containing such vapors.

According to the methods heretofore followed, when sulphur is distilled or obtained in the vapor form it is recovered as flowers of sulphur by leading the vapors into a roomy chamber where they are cooled by the contained gases and the sulphur is deposited in the form of fine flour-like crystals. When the chamber walls become too hot, the operation is interrupted and the chamber permitted to cool down. Such methods are unsatisfactory in practice because of the interrupted operation as well as because of the initial cost of the condensing chambers.

It has been considered impractical to condense sulphur vapors in ordinary condenser arrangements, because of the peculiar properties of sulphur. Sulphur melts at 113° C. (rhombic sulphur) and boils at 444.5; and at either temperature it is a mobile liquid. But in an intermediate range of temperatures, say from 160° C. to about 230° C., it is viscid. Around 200° C. viscidity is so great that sulphur hardly flows. Sulphur vapors entering a water cooled or air cooled condenser first deposit a thin layer of solid sulphur of extremely low heat conductivity, giving in fact a good heat insulation. On this surface viscid, non-flowing sulphur deposits. The greater the temperature difference between the vapors and the cooling surface the greater is the tendency toward formation of these layers. The double layer thus produced even while still quite thin substantially stops further heat transfer and condensation. A further difficulty in condensing sulphur from its vapors and particularly where the vapors are dilute, is the tendency of the sulphur to form a mist or dispersion; a more or less colloid "aerosol". Fine fumiform sulphur produced in cooling dilute sulphur vapors is quite difficult to collect. Further, in handling mixtures of sulphur vapors and gases stratification difficulties are apt to arise because of the great difference in specific gravity. A cooled layer depositing its sulphur becomes much lighter than the rest of the vapor-gas mixture and it is difficult to secure remixture.

In the present invention I condense sulphur vapors on walls with a positive temperature control; this temperature control keeping the condensing molten sulphur within a temperature range where it is mobile and flows off the cooling surface as soon as it is formed. While I may use condensation in the upper range of mobility, that is, somewhere near or at the boiling point of sulphur, for practical reasons I find it better to work in the lower range of mobility, between about 113° C. and 160° C. In so doing, I cool sulphur vapors, pure or dilute in the condenser to a temperature below the dew point of sulphur and to a temperature at which sulphur will run freely, introducing them to the condenser at a temperature slightly above the dew point.

According to an advantageous form of the present invention either sulphur vapors, or a gaseous mixture containing such vapors, is brought into contact with a surface positively maintained at a temperature within one of the ranges specified. The best temperature when the sulphur vapors contain much inert gas is one as near 115°–120° C. as can be maintained with condenser surfaces of effectively large area. With pure or nearly pure sulphur vapors, either a lower range of 140° to 150° C. or an upper range of 240 to 250° C. is advantageous. The condensing surfaces are best vertical or inclined to permit the sulphur to trickle down and flow away as fast as it condenses. Under these conditions, sulphur condenses as a mobile, free flowing liquid which can be collected, piped and otherwise handled conveniently on condition that the handling system be maintained at the same range of temperature. Sulphur flowing from the condenser may go directly into molds for the production of blocks or sticks.

While the invention may be applied in condensing sulphur vapors derived from any source, it is especially applicable and will be hereinafter described with particular reference to the condensation of sulphur from certain dilute gaseous mixtures obtained in the treatment of pyrites and similar sulphid ores according to processes disclosed in my copending applications 181,497 (now Patent 1,898,701) and 254,805 (now Patent 1,898,702) of which this application is in part a continuation. Application is in part a division. According to these processes sulphur is displaced from pyrites with a dilute chlorinating agent; dilution being usually with nitrogen. By reason of the presence of the diluent gas, it is possible to vaporize sulphur completely at temperatures below its boiling point. The dilute sulphur vapors can be removed from the system at temperatures around 315 to 330° C. or lower; temperatures at which ferrous chlorid and other like chlorids formed in chlorinating ore have no appreciable vapor tension. The sulphur delivered by the condenser is therefore pure. In practice it contains no chlorin and is of sufficient purity to be used in contact methods of making sulphuric acid. It does not poison platinum catalysts.

In carrying out the present method, it is necessary to provide condensing surfaces of positively controlled temperature so that the temperature of the sulphur vapors may be brought quickly to a point when condensation occurs but the liquid sulphur is outside the viscid range of temperatures. While other apparatus capable of effecting a positive and rapid cooling to a temperature within the lower range of high fluidity above mentioned, may be employed, an apparatus that has been found to be simple and satisfactory in operation comprises a structure of the type of a fire tube boiler so arranged as to permit of the maintenance of a steam pressure corresponding to the desired temperature; this steam pressure being usually between 15 and 75 lbs. gage pressure. With a fire tube boiler having the usual plurality of tubes, the current of sulphur vapor is subdivided into a plurality of smaller parallel flows, each of a convenient size to enable uniform temperature adjustment. Such an apparatus may also be employed when operating in the higher temperature range, but in doing so the use of a suitable high boiling liquid other than water is recommended.

In the detailed description of the invention, reference will be had to the attached drawings, in which:

Fig. 1 is partly in longitudinal vertical section and partly in elevation through a series of condensers having vertical tubes similar to the fire tubes of a fire tube boiler;

Fig. 2 is a horizontal sectional view on line 2—2 of Fig. 1;

Fig. 3 is a detail section through one of the vertical tubes of Fig. 1, showing a modified form of baffle means;

Fig. 4 is a longitudinal vertical section through a modified form of condenser provided with inclined tubular passages;

Fig. 5 is a detail section on the line 5—5 of Fig. 4;

Fig. 6 is a horizontal sectional view, with parts broken away, of a baffle chamber which may be used in conjunction with the condensers of Figs. 1 and 4 or modifications thereof;

Fig. 7 is a vertical cross-section taken on the line 7—7 of Fig. 6;

Fig. 8 is a horizontal section partly broken away showing a further modification of the baffle chamber; and Fig. 9 is a vertical section taken on the line 9—9 of Fig. 8.

In Fig. 1 of the drawings, there are shown three condensers 10a, 10b and 10c connected in series as regards sulphur vapors by water jacketed cross-over pipes 26 and 34, provided with plug gaskets 26—a to prevent water communication at this point. Water communication may be established by special cross-over pipes 65, valved at 66. Each condenser has the general structure of an upright fire tube boiler and is shown as consisting of a boiler shell having a section intermediate its ends provided with vertical tubes 12 connecting at their lower ends with a sulphur collecting chamber or header 14 and at their upper ends with a header 16. Feed water is introduced to the boiler jacket at 18 and the steam generated is vented at 20. Pressures in the condensers are indicated by gages 68. In order to insure that the sulphur vapors shall be brought into effective contact with the condensing surfaces and to assist in collecting sulphur mist formed during cooling of the vapors, the tubes 12 are internally provided with helices 22 which may consist for example of ordinary screw conveyor flights, or may be prepared by merely twisting flat steel stock while drawing it through suitable forms or dies. These helical devices impose a swirling motion on the passing gas-vapor current and the centrifugal action throws mist and heavy stratified layers outward against the tube walls. Instead of the helical baffle members 22 shown in Figs. 1 and 2, other forms of baffles may be provided. For example, perforated plates 23 (Fig. 3) may be disposed in spaced relation across the tubes 12.

Referring to condenser 10a, an inlet 24 for the sulphur-containing vapors or gases is provided adjacent the lower end of the condenser and an outlet 26 for residual gases or vapors is provided adjacent the upper end of the condenser. The lower end wall 28 of the condenser is preferably flared inwardly and downwardly to an outlet 30. It is to be noted that in the condenser all of the surfaces coming into contact with sulphur vapors or water are steam or water jacketed.

In operation the sulphur vapors are led into the chamber 14 through the inlet 24 and pass upwardly through the helical passages in the tubes 12. Some of the sulphur condenses directly on the walls of the tubes and some condenses as a mist of fine particles which impinge upon the metal surfaces of the tubes and of the helices. Centrifugal action, as stated, aids in producing impingement in the apparatus shown. The condensed sulphur runs down in freely liquid form into the sulphur-collecting chamber 14, wherefrom it may be drawn off either continuously or from time to time through the outlet 30 and the jacketed pipe 32 to a mold or other suitable means for receiving the same.

It is usually desirable to arrange several condensers in series. In Fig. 1 three such condensers are shown, condensers 10b and 10c being similar in construction to condenser 10a except that the gases leaving 10a and containing residual sulphur to be recovered are introduced to the condenser 10b through the header 16 at the upper end thereof and caused to pass downwardly through the tortuous passages in the vertical tubes thereof and thence into condenser 10c near the bottom thereof through the connecting pipe 34. The gases are then led through 10c in a similar manner as in 10a and out through an exit 36. It will often be desirable to operate the successive condensers at different temperatures, thereby providing for a greater efficiency as regards steam generation. For example, a steam pressure such that the condensing surfaces of the respective condensers shall be maintained at the following temperatures may be employed: 10a at 150° C.; 10b at 135° C.; and 10c at 115° C. Steam may be led off from each of the condensers through the steam outlets 20 by suitable pressure regulating valves, 67, and water may be introduced to each through the respective water inlet pipes 18 each connected to a constant level water feeding device, not shown; or, for some purposes and when treating some gaseous mixtures, it may be desirable to run the condensers as a single steam generating unit, feeding water to the jacket of condenser 10c and leading the same progressively through 10c, 10b and 10a in series, with venting of the steam generated through the steam outlet 20 of condenser 10a.

When operating on a large scale requiring a condenser of relatively large size, the use of a condenser of the type shown in Fig. 4 is recommended. In this modification the tubes are arranged nearly horizontal. The external shell 40 and the inner shell 42 cooperate to enclose a water jacket space, the latter being provided with an inclined tube section having tubes 12a and helices 22a fitted therein. These helices are the same as those shown in Figs. 1 and 2 except that the successive turns are scored or notched as indicated at 44 in Fig. 5 to permit the sulphur as it condenses and liquefies to flow freely along the tubes and into the header 16a. The sulphur-containing gases or vapors are led through the inlet pipe 46 to the header 47 adjacent the upper end of the condenser 10d and caused to pass downwardly through the inclined tubes, residual gases passing through the outlet 48. The liquefied sulphur is led through the outlet 50 and a water jacketed, liquid sulphur seal 52 to settling tanks, molds or any other convenient storage, not shown.

The apparatus may be further modified by omitting the helices or other baffling means used, as for example the perforated plates 23, from part or all of the condensers, in which case the exit gases while cooled to temperatures but little above the melting point of sulphur may still contain considerable amounts of sulphur as mist. When the condensers are so operated that this condition exists, it is preferable to pass the exit gases through additional collecting means wherein any sulphur mist present therein is acted on either by the action of gravity or by being caused to impinge upon a suitable baffle means, or both.

In Figs. 6 and 7 there is shown a steam jacket 54 defined by containing walls 56 and 58. Disposed within the steam jacket are a plurality of rows of inclined baffle plates 60; the plates in alternate rows being inclined oppositely to those of the immediately adjacent rows. The baffle chamber of Figs. 6 and 7 may be connected in series with one or more of the condensers shown in the preceding figures. This is particularly recommended when the helices in one or more, or all, of the condensers have been omitted. The gases led to the baffle chamber, as indicated by the arrow in Fig. 6, strike the first row of baffles and pass therethrough, going thence successively through the following series of baffles, thereby having their direction frequently changed, with the result of breaking up stratification and of causing liquid sulphur globules carried thereby or formed by condensation therein as a mist, to impinge upon the baffles. The collected sulphur runs down and accumulates at the bottom of the baffle chamber, whence the liquid sulphur is run off to discharge pipes, molds, etc. (not shown).

Figs. 8 and 9 show another modification of the baffle means that may be used in which 54a, 56a and 58a correspond to the similar elements of Figs. 6 and 7, and 62 indicates a plurality of inclined shelves. When gases are fed through the baffle chamber so formed, globules of sulphur carried thereby settle out by the action of gravity upon the plates and the sulphur so collected runs off the edges thereof upon the floor 64 from which it is collected as described in connection with Figs. 6 and 7.

While the invention has been described with particular reference to the condensation of sulphur from sulphur-containing vapors and gases, it will be understood that it is not limited in its application thereto. The method and apparatus may be applied with equal facility to the condensation of other substances normally existing as liquids or solids which present similar difficulties in cooling and condensing.

The present invention renders it practicable to purify crude sulphur by simple distillation. In so doing concentrated sulphur vapors are produced and there is no difficulty in condensing these under the present invention, using either the upper or the lower range of free liquidity. In the event that the sulphur contains volatile impurities, it is often advisable to utilize the principles laid down in the acknowledged copending applications Ser. No. 181,497 and Ser. No. 254,805 and vaporize the sulphur materially below its normal boiling point, 444.5° C., by using a current of diluting gas; usually nitrogen. By proper dilution sulphur can be efficiently vaporized at temperatures as low as 300° C. To lessen the amount of gas to be handled, however, it is in general advisable to work at somewhat higher temperatures, say around 350° to 370° C. In condensing sulphur from these dilute vapors, positive means for preventing stratification in the vapor-gas mixture during condensing, such as those shown, are in general necessary to prevent loss of sulphur as fume.

The present invention is also applicable in handling sulphur vapors produced in any other way; as in certain proposed methods of recovering underground sulphur by vaporizing it in place and bringing the vapors to the surface.

I however regard this invention as most advantageous in accomplishing one of the objects of the invention disclosed in said acknowledged applications: commercial production of pure sulphur from impure sulphid sources, such as ores and mattes. In these methods sulphur is displaced in the vapor form by a dilute chlorinating agent and the dilute sulphur vapors leave the system and are delivered to the condenser at a relatively low temperature; a temperature usually substantially below the boiling point of sulphur but above its dew point in the mixture. The particular temperature used is so correlated with the proportion of diluting gas present that the mixture is above the dew point of sulphur. In so doing and in passing over unchanged sulphids the vapors are freed of chlorin and of any ferric chlorid or sulphur chlorid which may have been originally produced by or occur in the chlorinating agent. Ferrous chlorid and like chlorids, such as the chlorids of nickel, cobalt, lead, copper, silver, etc., have little vapor tension at any temperature substantially below the boiling point of sulphur (444.5° C.) and do not contaminate the sulphur vapors. Even zinc chlorid, which is somewhat more volatile, has no appreciable vapor tension below say about 375° C. In this operation vapors may leave the chlorinating zone proper at 444.5° C. or higher; but if they are cooled below this temperature or down to say 375° C. prior to going to the condenser they do not take forward ferrous chlorid or other heavy metal chlorids. In passing through the condenser since no part of the pathway for sulphur vapors is at a temperature below, say 113° C., vapors of materials more volatile than sulphur do not condense.

In cooperative use of the invention of the copending application and of the present invention it becomes practicable to deliver chemically pure sulphur from pyrite and similar impure sources in mass production; delivering a continuous flow of mobile liquid sulphur which can be piped and handled and which can be converted into sticks, pigs or ingots by suitable molds or mechanical casting apparatus.

Various changes may be made in the details of the procedure outlined and in the details of the construction of the apparatus without departing from the invention, which is not to be deemed as limited other than as indicated in the appended claims.

What I claim is:

1. In a condensing chamber for sulphur and similar vapors, a jacketed condensing chamber, means for controlling the pressure maintained in said jacket, a mist-collecting chamber connected to said condensing chamber, means for leading vapors to be condensed to said condensing chamber, means for leading a residue of uncondensed vapors exiting from said condensing chamber to said mist-collecting chamber, means for controlling the temperature of said mist-collecting chamber and means for collecting and withdrawing the condensate from said chambers.

2. A condenser for condensing sulphur and similar substances from mixtures of vapors of the same with gaseous diluents comprising an inner shell defining a condensing chamber, an outer shell spaced therefrom and cooperating therewith to define a fluid-containing jacket, said fluid-containing jacket substantially surrounding said condensing chamber, said condensing chamber having a vapor inlet, a vapor outlet for continuously removing uncondensed vapors or gases during the operation, and a separate outlet for removing condensed liquid from said condensing chamber, said outer shell having an inlet for introducing fluid into said jacket and having an outlet for removing vapors of the fluid contained in said jacket, said inlet for the fluid being in direct communication with all parts of said jacket, means for controlling the fluid pressure maintained in said jacket and means for maintaining and controlling the level of the fluid in said jacket.

3. In a condenser for condensing sulphur and similar substances from mixtures of vapors of the same with gaseous diluents, an inner shell defining a condensing chamber, said condensing chamber comprising spaced upper and lower header sections and an intermediate tube section connecting said spaced header sections and presenting inclined surfaces to vapors passed therethrough, means for introducing vapors into one of said header sections, means for withdrawing residual vapors from the other of said header sections, means for removing condensed liquid from the said lower header section, an outer shell spaced from said inner shell and cooperating therewith to define a fluid-containing jacket, said fluid-containing jacket substantially surrounding all of said condensing chamber and surrounding said means for withdrawing condensed liquid, an inlet in said outer shell for introducing fluid into said jacket, said inlet in the outer shell being in direct communication with all parts of said jacket, an outlet in said outer shell for removing vapors from said fluid in said jacket, and means for controlling fluid pressure maintained within said jacket, said means for controlling the fluid pressure being adjacent to the said outlet in said outer shell.

4. In a condenser for condensing sulphur and similar substances from mixtures of vapors of the same with gaseous diluents, an inner shell defining a condensing chamber, said condensing chamber comprising spaced upper and lower header sections and an intermediate tube section connecting said spaced header sections and presenting inclined surfaces to vapors passed therethrough, the tubes of said intermediate section containing baffles disposed therein, means for introducing vapors into one of said header sections, means for withdrawing residual vapors from the other of said header sections, means for removing condensed liquid from the said lower header section, an outer shell spaced from said inner shell and cooperating therewith to define a fluid-containing jacket, said fluid-containing jacket substantially surrounding all of said condensing chamber and surrounding said means for withdrawing condensed liquid, an inlet in said outer shell for introducing fluid into said jacket, said inlet in the outer shell being in direct communication with all parts of said jacket, an outlet in said outer shell for removing vapors from said fluid in said jacket, and means for controlling fluid pressure maintained within said jacket, said means for controlling the fluid pressure being adjacent to the said outlet in said outer shell.

5. The process of recovering sulphur from gaseous mixtures containing its vapors which comprises passing such a gaseous mixture through a plurality of condensing zones arranged in series, each said zone being provided with an extended, inclined surface, the temperature of which is maintained within a range such that when sulphur is brought into contact therewith and to the temperature thereof it is in a freely flowing, liquid condition, and the temperatures of said surfaces being further regulated so that those surfaces in the zones more remote from the point of introduction of the gaseous mixture to the system are maintained at progressively lower temperatures than those surfaces in the zones nearer to the said point of introduction, said process further comprising lowering the temperature of the gaseous mixture below the dew point of sulphur in the gaseous mixture as constituted by imparting to such mixture a swirling motion and simultaneously bringing it into positive contacting relation with said extended surfaces of the said zones in series, thereby condensing the sulphur from such mixture, and flowing the condensed sulphur away from said surfaces substantially as fast as formed.

6. The process of recovering sulphur from gaseous mixtures of sulphur and heavy metal chlorids such as ferrous chlorid and zinc chlorid, which comprises diluting said gaseous mixture with inert gas in such amount as to lower the dew point of sulphur in the gaseous mixture as constituted to a point where substantially none of the heavy metal chlorids will remain in gaseous form in the mixture as constituted, lowering the temperature of the thus diluted mixture to a point close to but above the dew point of sulphur, to separate out said metal chlorids by condensation, and then further lowering the temperature of the residual dilute gaseous mixture below the dew point of sulphur in such residual dilute gaseous mixture as constituted by imparting to such mixture a swirling motion and simultaneously bringing it into positive contacting relation with an extended, inclined surface, the temperature of which is maintained within a range such that when the sulphur is brought into contact therewith and to the temperature thereof it is in a freely flowing liquid condition, thereby condensing sulphur from such mixture, and flowing the condensed sulphur away from said surface substantially as fast as formed.

ERNEST W. WESCOTT.